(12) United States Patent
Toriumi et al.

(10) Patent No.: US 6,590,070 B1
(45) Date of Patent: Jul. 8, 2003

(54) THERMOSETTING ADHESIVE COMPOSITION AND ADHERED STRUCTURE

(75) Inventors: Naoyuki Toriumi, Zama (JP); Koichiro Kawate, Machida (JP); Masaaki Takeda, Sagamihara (JP); Shigeyoshi Ishii, Hachiouji (JP); Koji Itoh, Ebina (JP)

(73) Assignee: 3M Innovative Properties Company, St. Paul, MN (US)

( * ) Notice: Subject to any disclaimer, the term of this patent is extended or adjusted under 35 U.S.C. 154(b) by 26 days.

(21) Appl. No.: 09/664,686

(22) Filed: Sep. 19, 2000

(30) Foreign Application Priority Data

Sep. 30, 1999 (JP) .......................................... 11-279131

(51) Int. Cl.⁷ ................. C09F 1/02; C09F 1/04
(52) U.S. Cl. ................. 530/211; 530/210; 530/215; 530/230; 530/232; 527/600; 428/500; 428/521
(58) Field of Search ................. 428/497, 500, 428/521, 524; 527/600, 602, 603; 530/210, 211, 215, 230, 232

(56) References Cited

U.S. PATENT DOCUMENTS

| 4,895,567 A | 1/1990 | Colon et al. |
| 6,051,652 A | 4/2000 | Kawate et al. |
| 2001/0008689 A1 * | 7/2001 | Muta et al. .............. 428/355 C |

FOREIGN PATENT DOCUMENTS

| JP | 9-137028 | 5/1997 | |
| JP | 10-316955 | 12/1998 | |
| JP | 10-10316955 | * 12/1998 | .......... C09J/133/08 |

* cited by examiner

Primary Examiner—James J. Seidleck
Assistant Examiner—Travis B Ribar
(74) Attorney, Agent, or Firm—Jennie G. Boeder (57) ABSTRACT

This invention provides thermosetting adhesives which have properties advantageous for bonding electronic parts that are capable of being cured using a low dose of radiation such as electron beam. The thermosetting adhesive of the invention comprises (a) ethylene-glycidyl (meth)acrylate copolymer; (b) rosin having a carboxyl group; and (c) (meth)acrylate having a carboxyl group.

6 Claims, 4 Drawing Sheets

THERMOSETTING ADHESIVE COMPOSITION AND ADHERED STRUCTURE

This application claims priority from Japanese Serial No. 279131/99, filed Sep. 30, 1999.

TECHNICAL FIELD

This invention relates to a thermosetting adhesive composition and a structural adhesive which uses the same.

BACKGROUND OF THE INVENTION

In packaging integrated circuits (IC), thermosetting adhesive compositions are often used for bonding the electronic parts. These thermosetting adhesive compositions can be a reactive hot-melt adhesive composition or just a reactive hot-melt composition. Such adhesive compositions form bonds that have superior heat resistance due to a crosslinking reaction (curing) which is initiated by heating or irradiation after applying pressure.

As shown in Japan Patent No. H 9-137028 or No. H 10-316925, when the reactive hot-melt adhesive includes polyethylene or another polyolefin, conductivity is reduced, outgassing increases, and humidity-absorption is worse. At the same time, it controls mixing of impure ions.

In detail, Japan Patent No. H 9-137028 describes a reactive hot-melt composition which includes: (a) a thermo plastic polymer which includes polyolefin which has epoxy groups; and (b) a copolymer obtained from irradiation-polymerization of a monomer that consists of acryl compounds which include aliphatic alkyl (meth)acrylate and functional groups that reacted with thee epoxy groups. This reactive hot-melt composition has features such as: (1) it controls the generation of reaction byproducts; (2) it does not require solvent when it is molded into film; (3) it can be stored at room temperature with high stability; and also (4) it does not need to be exposed to radiation when pressure is applied and can be used for parts where radiation can not reach.

The relative amount of this monomer component which forms copolymer (b) in this reactive hot-melt composition is high compared to the whole composition. Typically, the monomer component comprises 15 to 60 weight percent of the precursor, which includes this monomer component and a thermoplastic polymer. It is hard to mix with the thermoplastic polymer. Accordingly, the monomer component has a tendency to bleed out before the precursor is exposed to radiation. In addition, part of the monomer component above is volatile and causes out gassing and bad odor. It is especially not preferred for bonding electronic parts. Therefore, in such case, the precursor is generally cured using high levels of radiation in order to avoid out gassing and bad odor of the unreacted monomer component due to bleed out.

Japan Patent No. H 10-316955 describes a thermo-setting adhesive which includes: (a) ethylene-glycidyl (meth) acrylate copolymer; (b) ethylene-alkyl (meth)acrylate copolymer; and (c) rosin which has a carboxyl group. This thermosetting adhesive differs from the reactive hot-melt composition in Japan Patent No. H 9-137028, and it does not include a volatile and reactive monomer component. Therefore, high levels of radiation are not thought to be necessary in order to avoid bad odor and out gassing.

However, in order to obtain the desired fluidity for hot pressing the hot-melt and thermo-setting adhesive above, it is necessary to use high levels of radiation (for example, electron beam). For example, Japan Patent No. H 10-316955 describes a relatively powerful electron beam (150 kGy) which is used to irradiate the thermosetting adhesive. In this case, improved crosslinking of the polyethylene is expected, but the main or side chains of each component are partially cut, and there is a tendency to generate volatile products or ions with low boiling points which can cause bad odor and out gassing. In addition, when the thermosetting adhesive is used with films set on a liner, there is tendency to foam due to the high levels of radiation which are transformed into heat energy. Foaming could occur during hot pressing or post curing. In any case, it not only causes bad appearance of the film, but it also may reduce the bond strength. Furthermore, using electron beam at high power levels with thermosetting adhesives is not generally effective.

In order to reduce the power level of the electron beam required, addition of electron beam sensitizers has been well known. Typical electron beam sensitizers for use with polyethylene are triallyl cyanurate (TAC), triallyl isocyanurate (TAIC), or trimethylol propane trimethacrylate (TMPTMA). All of these electron beam sensitizers usually have vinyl groups or (meth)acrylate groups that react easily in response to electron beam. They contribute to improved crosslinking in the thermosetting adhesive. As a result, it is expected that electron beam power can be reduced and still obtain the required fluidity.

However, in the case when this electron beam sensitizer is added to thermosetting adhesive composition listed in, for example, Japan Patent No. H 10-316955 (compared to the case where electron beam sensitizer is not added), there are cases when the amount cannot be reduced in order to obtain the desired fluidity. Even if it could be reduced, bond strength is lowered in accordance with it, and the adhesive properties could be degraded.

Therefore, the object of this invention is to offer a thermosetting adhesive composition with the desired features which is useful for bonding electronic parts that may be cured by a low-power electron beam.

SUMMARY OF THE INVENTION

In one aspect, the invention provides a thermosetting adhesive composition comprising:

(a) ethylene-glycidyl (meth)acrylate copolymer;
(b) rosin with a carboxyl group; and
(c) (meth)acrylate with a carboxyl group.

In another aspect, the invention is an article or structure comprising a first adherent, a second adherent, and a layer of the thermosetting adhesive of invention between the first adherent and the second adherent bonding the first and second adherents together. Preferably, these layers are bonded by hot pressing or laminating.

DETAILED DESCRIPTION

The thermosetting adhesive of this invention has properties that make it desirable for bonding electronic parts even if the thermosetting adhesive is cured by a low-power electron beam.

The thermosetting adhesive composition of this invention is basically a mixture which comprises:

(a) ethylene-glycidyl (meth)acrylate copolymer;

(b) rosin with a carboxyl group; and (c) (meth)acrylate with a carboxyl group.

Basically, the ethylene-glycidyl (meth)acrylate copolymer is prepared from a mixture including, for example, (1) a glycidyl (meth)acrylate monomer, and (2) an ethylene monomer.

This ethylene-glycidyl (meth)acrylate copolymer can be cured and reacted with rosin. This thermosetting reaction usually occurs when the adhesive composition is heated to a predetermined temperature. The thermosetting adhesive has higher cohesive energy after the reaction.

In this invention, the amount of ethylene-glycidyl (meth) acrylate copolymer is usually 20 to 99.89 weight percent, preferably 40 to 96 weight percent. With such ratios, the cohesive energy of thermosetting adhesive can be improved remarkably. High cohesive energy is advantageous for improving bonding performance such as the release-bonding strength (may also be called "release strength" herein) of the thermosetting adhesive. In addition, if the amount of ethylene-glycidyl (meth)acrylate copolymer is less than approximately 20 weight percent or higher than approximately 99.89 weight percent, there is a possibility that the cured thermosetting adhesive will not have the desired cohesive energy.

The ethylene-glycidyl (meth)acrylate copolymer adhesive composition melts at relatively low temperature.

The melt flow rate (MFR) of this copolymer measured according to Japan Industrial Standard K6760 should be at least 1 or more at 190° C. That is necessary to facilitate melt coating of the adhesive. When the MFR value is high, it causes a drop in cohesive energy of the cured adhesive, so the MFR is preferably in the range of 1 to 1,000. The weight average molecular weight of the ethylene-glycidyl (meth) acrylate copolymer is selected appropriately to attain the proper MFR.

The ethylene-glycidyl (meth)acrylate copolymer can form crosslinking structure either directly or through the (meth) acrylate which contains a carboxyl group as stated above. Such crosslinking structure is generally formed by irradiation using electron beam. The crosslinking structure can add elastic modules which are advantageous for hot pressing or laminating the thermosetting adhesive.

As long as it does not damage the effects of this invention, a three-dimensional or multi-dimensional copolymer can be formed by adding, for example, propylene, alkyl (meth) acrylate, or vinyl acetate as the third monomer to (1) glycidyl (meth)acrylate monomer, and (2) ethylene monomer.

Generally, the number of carbon atoms in the alkyl group of the alkyl (meth)acrylate is in the range of 1 to 8.

Also, this copolymer includes repeating units coming from ethylene and glycidyl (meth)acrylate normally with approximately 50 weight percent or higher, preferably approximately 75 weight percent or higher. Furthermore, in this repeating unit, the weight ratio of components originating from the glycidyl (meth)acrylate and ethylene is in a predetermined range. If the amount of ethylene is too small, it may cause a drop in conductivity or an increase in the humidity-absorbing rate. On the other hand, if the amount of ethylene is too great, there is possibility that bonding performance is reduced. Therefore, the weight ratio (G:E) of glycidyl (meth)acrylate (G) and ethylene (E) is preferably in the range of 50:50 to 1:99, or 30:70 to 5:95 at best.

In the thermosetting adhesive composition, rosin with at least one carboxyl group is included. As stated above, rosin with a carboxyl group is cured and reacts with the ethylene-glycidyl (meth)acrylate copolymer in order to achieve the desired cohesive energy of the thermosetting adhesive.

In this invention, the amount of rosin with a carboxyl group is usually 0.1 to 30 weight percent of thermosetting adhesive composition. When the amount of rosin with the carboxyl group is less than approximately 0.1 percent, the thermosetting adhesive composition will not cure sufficiently, causing a tendency toward low cohesive energy. If the amount of rosin having a carboxyl group exceeds approximately 30 percent, there is a danger of gelling during film manufacturing using the thermosetting adhesive. Considering these facts, the amount of rosin with a carboxyl group should be 1 to 25 weight percent of the thermosetting adhesive.

Rosin with a carboxyl group can improve bonding performance of the thermosetting adhesive. This rosin can be gum rosin, wood rosin, or tar oil rosin. The rosin should be chemically denatured (transformed). Especially when a carboxyl group is added by denaturing the rosin with acid using various methods, denaturing is very effective for improving the acid value which will be explained later. In the present invention, the carboxyl group includes one which are produced from acid anhydride by adding heat or moisture, etc. Rosins which are denatured with acid include, for example, rosins made by adding acrylic acid, fumaric acid, or maleic anhydride to lepipomal acid which has isomerized abietic acid which is a component of rosin formed by the Diels-Alder reaction.

It is preferred that the acid value of the rosin with the carboxyl group is in the range of 100 to 350. An acid value which is lower than approximately 100 reduces the reaction with ethylene-glycidyl (meth)acrylate copolymer, and this tends to adversely affect the curing nature of the adhesive composition. On the contrary, an acid value higher than approximately 350 may cause gelling of the thermosetting adhesive composition during manufacturing of the adhesive film using this composition. The acid value is expressed in mg (milligram) of potassium hydroxide necessary for neutralizing 1 g of sample.

The softening point of the rosin with a carboxyl group should be approximately 200° C. or lower. That is because rosin with a softening point which is higher than 200° C. does not react as easily with ethylene-glycidyl (meth) acrylate copolymer, and this may reduce the curing property of this composition.

In the thermosetting adhesive compositions of the invention, at least one kind of (meth)acrylate is also included as an electron beam sensitizer. The (meth)acrylate used in this invention includes at least one carboxyl group. In the present invention, as stated above, this carboxyl group is produced from acid anhydride due to the influence of heat or moisture. Also, the (meth)acrylate has at least one (meth) acryl group. In this (meth)acrylate, the carboxyl group has a high affinity for the epoxy group in the ethylene-glycidyl (meth)acrylate copolymer in the adhesive composition. It can be dispersed more uniformly in the thermosetting adhesive than other vinyl or (meth)acrylate compounds. This ease of dispersion is very advantageous for kneading each component.

Normally, a small amount of this (meth)acrylate is added to adhesive composition as an electron beam sensitizer. If it is added in large amounts, there is a tendency to lower bond strength. Furthermore, it may cause bleed out or outgassing before it is cured by electron beam.

A typical amount of (meth)acrylate is in the range of 0.01 to 10 weight percent. If it is less than 0.01 weight percent, it will not be an effective electron beam sensitizer. On the other hand, if it exceeds 10 weight percent, as stated above, it may cause a drop in bond strength or bleed out or outgassing before curing by an energy source such as electron beam. A suitable amount is in the range of 0.05 to 5 weight percent.

Generally, (meth)acrylate is very sensitive to electron beam. When only a small amount of (meth)acrylate is added as stated above, instead of forming a network by itself, it will be an agent for crosslinking of the ethylene-glycidyl (meth) acrylate copolymer. As a result, this electron beam sensitizer promotes crosslinking of the thermosetting adhesive. The electron beam dose required will be sufficient at approximately 50 kGy. Accordingly, when the amount of radiation is reduced, decomposition caused by radiation is also reduced. As a result, when radiation is transformed into heat, the energy dissipates and foaming is controlled. Because of this, this thermosetting adhesive has an improved appearance.

Crosslinking enables control of the fluidity of the thermosetting adhesive composition. In the present invention, fluidity is defined by the stored elastic modulus (G') at 150° C. measured as described in the following.

The adhesive composition before hot pressing and before application to the object to be bonded is used as the sample. Using a dynamic viscosity and modulus of elasticity measurement device, the temperature of the sample is raised from 80° C. to 280° C. at 5° C./min., and the modulus is measured at a shear rate of 6.28 rad/sec. The obtained chart (temperature verse storage modulus) shows the value of storage modulus at 150° C. which is then adopted as the "storage modulus of the adhesive composition".

The storage modulus (G') as defined above is preferably in the range of $10^2$ to $10^6$ Pa. If the elastic modulus exceeds approximately $10^6$ Pa, there is a danger of reduced bond strength due to insufficient wetting of the object to be bonded. If it is less than approximately $10^2$ Pa, it flows excessively. Furthermore, there is also a possibility of a related reduction in bond strength.

When the electron beam sensitizer is used according to this invention, the desired fluidity of the adhesive during hot pressing does not depend on the amount of irradiation by electron beam. As a result, even if the mount of irradiation is changed slightly due to machine reasons, the fluidity is not influenced much. In other words, the electron beam sensitizer enlarges the process window of the adhesive composition, which is much desired for manufacturing reasons.

The (meth)acrylate with a carboxyl group or acid anhydride structure above includes (meth)acrylic acid, (meth) acryloxyethyl phthalate, (meth)acryloxyisopropyl phthalate, ethylene oxide denatured succinate (meth)acrylate, ethylene oxide denatured malonate (meth)acrylate, ω-caroboxy-polycaprolactone monoacrylate, ethylene oxide denature adipate (meth)acrylate, (meth)acrylate dimer, 4-(meh) acryloxyethyl trimellitic anhydride, or 4-(meth) acryloxyethyl trimellitic acid. Among these (meth)acrylate, (meth)acryloxyethyl phthalate (meth)acryloxyisopropyl phthalate or (meth)acrylate dimer are preferred. That is because these do not irritate the skin very much and are easy to handle. Since they do not evaporate easily, bad odor or corrosion of the kneading machine can be prevented. In addition, reduced pressure processes for removal of moisture or other volatile component in kneading device or prevention of foaming can be performed easily without evaporating these components.

As long as it does not damage the effects of this invention, various additives can be used with the thermosetting adhesive composition of this invention in addition to the above components.

Examples of such additives are described in Japan Patent No. H 10-316955. They include ethylene-alkyl (meth) acrylate or polyolefin or their copolymers, tackifiers, rubber components, antioxidants, UV absorbents, lubricants such as wax, crosslinking agents, curing promoters, photo initiators, photo sensitizers, or fillers. The type of filler is not limited specifically, and it can consist of an organic or inorganic substance, metal, or pigment; it can also be an electrical insulator or conductor. The photo initiator or photo sensitizer is added for controlling further bleed out of the electron beam sensitizer due to irradiation by light such as UV rays after the film is formed.

The thermosetting adhesive composition of the invention explained above is solid at room temperature. This thermosetting adhesive composition is used by forming it into a stick or film. Especially, a film made from this thermosetting adhesive (adhesive layer) can be put between objects to bonded without applying it to one object beforehand. In other words, a lamination can be pre-assembled by sandwiching a thermosetting adhesive film between the two objects to be bonded. Normally, hot pressing is done to this laminated body. Suitable process conditions for hot pressing this laminate are 1 to 1,000 N/cm² at 80 to 300° C. which is a relatively low temperature. Hot pressing should be done for 0.1 to 30 seconds. As a result, the thermosetting adhesive forms a bond with sufficient strength.

Also, if necessary, the hot pressed lamination can be post cured to improve bond strength. Post cure means heating the hot pressed lamination to further cure the thermosetting adhesive.

This thermosetting property of the adhesive in this invention is thought to be due to bonding between the epoxy group in the ethylene-glycidyl (meth)acrylate copolymer and the carboxyl group in the rosin (or a carboxyl group produced from the rosin with an acid anhydride structure by heat or moisture) or a carboxyl group in the ethylene-glycidyl (meth)acrylate copolymer and (meth)acrylate (or a carboxyl group produced by heat or moisture). Or it may be due in part to the reaction between hydroxyl groups generated from the above reaction and remaining epoxy group. The thermosetting temperature is normally 100° C. or higher, preferably 110 to 200° C. The thermosetting time is normally 1 minute to 24 hours. To reduce the post curing required, the thermosetting process parameters should be 120 to 180° C. and 30 minutes to 2 hours.

Such relatively low temperature hot pressing and post curing at relatively low temperature and short time are suitable for bonding objects such as IC part with relatively low heat resistance or printed circuit substrates or other electronic parts. However, the application of the thermosetting adhesive in this invention is not limited to these; it can be used for polyether imide, polyamide, polyimide, polycarbonate, polyethylene, polypropylene, polyester, epoxy, or other plastic, copper, iron, nickel, gold, silver, aluminum, tungsten, molybdenum, white gold, other metals, or semiconductors such as fiber, silicon, ceramic, glass, etc.

Also, bonding tape that can be hot pressed can be manufactured by forming a layer of the thermosetting adhesive of this invention on plastic film, fiber cloth, metal foil, or other substrates. In addition, the adhesive of this invention can be used as a sealing material in addition to the bonding applications described above.

For example, thermosetting adhesive films can be manufactured as follows:

First, a predetermined amount of each component (a) ethylene-glycidyl (meth)acrylate copolymer, (b) rosin with a carboxyl group (or acid anhydride structure), and (c) (meth) acrylate with a carboxyl group (or acid anhydride structure) is put into a mixing device. Examples of useful mixing devices include kneader, roll mill, extruder, planetary mixer, or homo-mixer can be used. Also, above additives could be put into the mixing device if necessary.

The mixing device is started, the above ingredients are mixed, and a mixture is obtained. This mixture has fluidity suitable for mixing, and each component is easily dispersed uniformly. Temperature and time of mixing are selected so that the components will essentially not have time to react with each other. Normally, temperature is in the range of 60 to 150° C.; time is in the range of 1 minute to 1 hour.

Next, this mixture is hot melt coated on the substrate, and a precursor film is formed. The fluidity of the above mixture is suitable for this coating process. Therefore, a precursor film with a uniform thickness can be obtained. The substrate can be either a liner or one of the objects to be bonded. Conventional liners such as release paper or release film can be used. Also, coating is done using conventional processes such as knife coating or die coating in the temperature range of preferably 60 to 150° C. The precursor film can also be formed by extrusion. In this case, a substrate is not required. Its complex viscosity $\eta^*$ should be 1,200 to 10,000 poise (120–1,000 Pas) when measured at 120° C. and 6.28 rad/sec. If the complex viscosity $\eta^*$ is lower than approximately 1,200 poise (120 Pas), it may be difficult to coat at a predetermined thickness. On the contrary, if it is higher than 10,000 poise (1,000 Pas), it may be difficult to obtain a continuous coating.

Although the thickness of the precursor film is not limited specifically, preferably it is in the range of 0.005 to 5 mm. If it is thinner than approximately 0.005 mm, handling becomes difficult. On the other hand, if it is thicker than approximately 5 mm, crosslinking is not uniform in the direction of thickness, and reliability of the thermosetting adhesive will be lowered.

While a certain amount of fluidity in the above mixture is advantageous for mixing or coating, fluidity causes leakage of the material during the thermo setting process that may cause, for example, a loss in bond strength.

Therefore, electron beam is applied continuously to the precursor film, and a crosslinked structure is formed between molecules of copolymer. This occurs between ethylene units, and a thermosetting adhesive film with a suitable fluidity is obtained.

Irradiation by electron beam is normally done at 150 keV to 500 keV accelerating voltage, or if necessary 10 to 500 kGy or up to 250 kGy for a thermosetting adhesive with high fluidity. When the electron beam is applied to a precursor film thicker than described above, an accelerating voltage higher than 500 keV, or a $\Gamma$ beam may be used. $\Gamma$ beam is especially effective when the precursor film is wound into a roll. After that, if necessary, one or both sides may be protected by a liner which is removed when the product is used.

EXAMPLES

In the following, this invention is going to be explained using the following examples. However, this invention is not limited to only these examples.

Manufacturing of Sample

First, (a) ethylene-glycidyl (meth)acrylate copolymer, (b) rosin with a carboxyl group, and (c) (meth)acrylate with a carboxyl group are combined in the predetermined ratios (weight ratio) shown in Table 1. They were put into a kneading machine (Leocord 90, manufactured by Harke). Next, this kneading machine was run for 10 minutes at 60 rpm at 120° C., and a uniform block shaped mixture of the components above was prepared.

TABLE 1

| | Composition |
|---|---|
| Example 1 | CG5001/KR85/M5600 = 100/7/1 |
| Example 2 | CG5001/KR85/M5600 = 100/7/2 |
| Example 3 | CG5001/KR85/M5600 = 100/7/3 |
| Example 4 | CG5001/KR85/#2100 = 100/7/1 |
| Example 5 | CG5001/KR85/#2100 = 100/7/3 |
| Example 6 | CG5001/6070/KR85/M5600 = 70/25/5/1 |
| Reference Example 1 | CG5001/KR85 = 100/7 |
| Reference Example 2 | CG5001/6070/KR85 = 70/25/5 |
| Comparative Example 1 | CG5001/KR85/TMPTMA = 100/7/1 |
| Comparative Example 2 | CG5001/KR85/TMPTMA = 100/7/3 |
| Comparative Example 3 | CG5001/KR85/TMPTMA = 100/7/5 |
| Comparative Example 4 | CG5001/KR85/TAC = 100/7/1 |
| Comparative Example 5 | CG5001/KR85/TAC = 100/7/3 |
| Comparative Example 6 | CG5001/KR85/BS101 = 100/7/1 |

Note:
CG5001: ethylene-glycidyl methacrylate copolymer manufactured by Sumitomo Chemical K.K.
6070: ethylene ethyl acrylate copolymer manufactured by Nippon Unicar
KR85: rosin manufactured by Arakawa Chemical (acid value = 170 mgKOH/g)
M5600: acrylic acid dimer manufactured by Toa Gosei
2100: acryloxyisopropyl phthalate manufactured by Osaka Yuki Kagaku
TMPTMA: trimethylol propane trimethacrylate manufactured by Nippon Kayaku
TAC: triallyl cyanurate manufactured by Nippon Kasei
BS101: rosin acrylate manufactured by Arakawa Chemical Next, the mixture was inserted between two 100 $\mu$m thick polyester films, and it was passed through a knife coater heated to 150° C. and formed into a film with approximately 100 $\mu$m thickness. Next, the polyester film was removed from one side, and the web was irradiated from the adhesive side by a 200 keV electron beam until the total dose was 50 kGy, and a sample was manufactured.

Samples were also manufactured at dose levels of 50 kGy, 100 kGy, and 150 kGy.

One sample was not irradiated by electron beam at all.

When the above samples were manufactured, bleed out was not observed in the thermosetting adhesive in the Examples before or after irradiation by the electron beam. This was true of the Comparative Examples and Reference Examples as well, and bad odor was essentially eliminated.

Evaluation of Samples
(1) Evaluation of Bond Strength
Evaluation of bond strength was done as follows:
First, polyester film was removed from the sample, and the thermosetting adhesive was exposed. Next, the thermosetting adhesive film was cut into 1 cm×3 cm rectangles, and it was inserted between a 0.3 mm thick copper plates and a 50 µm thick layer of polyimide. After that, 50 N/cm² pressure was applied for 10 seconds while heating it to 200° C., and the bond was formed.
After that, a peel test was performed by pulling the edge of the polyimide layer at 50 mm/min. Bond strength at a peel angle of 90° was adopted as the bond strength. The reported result was an average value of two samples. Post curing was done by heating each sample for 2 hours at 150° C. in an oven.

(2) Evaluation of Fluidity
Evaluation of fluidity was done as follows:
First, the sample was molded into a 6 mm diameter disc. Next, the polyester film was removed, exposing the thermosetting adhesive film. This disc shaped thermosetting adhesive was inserted between a 1.1 mm thick glass plate and a 0.3 mm thick copper plate. After that, it was heated to 180° C., and 1050 N/cm² pressure was applied for 10 seconds. Following the formula below, the ratio of diameters was calculated, and fluidity was evaluated. The reported result was the average value of two samples.

diameter increase ratio (percent)=[diameter of sample after hot pressing and bonding (mm)/6 (mm)]×100     Formula 1

(3) Bleed Out Evaluation
Bleed out evaluation was done as follows:
A copper plate washed with ethanol was bonded at room temperature using the sample. The copper plate was removed from the sample and the residue remaining on the copper plate was observed by the naked eye. Existence of bad odor was also evaluated.

(4) Measurement of Viscoelasticity
The viscoelasticity was measured by measuring the elastic modulus (G' or E') at temperature as described in the following three methods:

(a) Measurement of Viscoelasticity 1
The samples from Example 1 and Example 5 were irradiated by an electron beam until the total dose was 50 kGy. These samples were molded into 25 mm diameter discs, and the polyester film was removed. The thermosetting adhesive was taken out. Next, eight thermosetting adhesive layers were stacked up to a total thickness of approximately 1 mm. This assembly was attached to a 25 mm diameter plate on the measurement tool. The temperature was raised 5° C. at one minute intervals over a range of 100 to 300° C. The change in elastic modulus at 6.28 rad/sec was measured using a dynamic viscoelasticity measurement device (RDAII) manufactured by LeoMetrix Co. Ltd. The same measurement was done to the sample from Reference Example 1 and Reference Example 2 which had been irradiated by electron beam until the total dose was 150 kGy.

(b) Measurement of Viscoelasticity 2
The sample from Example 6 which had been irradiated by electron beam until the total dose was 50 kGy was post cured for 2 hours at 150° C. After that, it was cut into 35×10 mm rectangles. The polyester film was removed, and the thermosetting adhesive was taken out. Next, the temperature of this thermosetting adhesive was raised in 10° C. steps in the range of −70 to 250° C. While doing that, the change in elastic modulus at 6.28 rad/sec was measured using a dynamic viscoelasticity measurement device (RSAII) manufactured by LeoMetrix Co. Ltd. This measurement was also done to the sample from Reference Example 2 which had been irradiated until the total dose was 150 kGy.

(c) Measurement of Viscoelasticity 3
In this measurement, the remaining samples from Example 6 and Reference Example 2 were prepared. Measurement of viscoelasticity was done by the same method as in 1 above, except that the temperature was maintained at 120° C. by adding heat, and the gel time was measured. This gel time is defined as the time when temperature of thermosetting adhesive reached 120° C. till the time when the elastic modulus exceeded the last elastic modulus.

Figure 1:
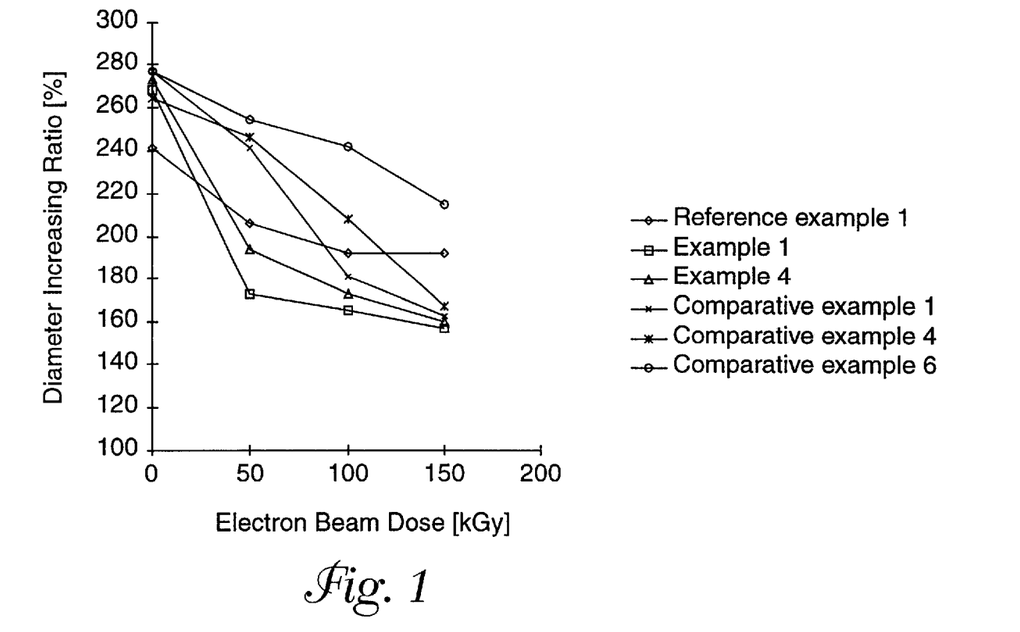
FIG. 1 shows the change in diameter increase ratio for the thermosetting adhesive from Example 1 and Example 4, and Comparative Examples 1, 4, and 6 as a function of electron beam dose.

Result of Evaluation
FIG. 1 shows the increase in diameter of the thermosetting adhesive from Example 1 and Example 4, and Comparative Examples 1, 4, and 6 as shown in Table 1 as a function of the total dose of electron beam. The change in increasing rate for the thermosetting adhesive from Reference Example 1 is also listed on the graph in FIG. 1.

According to FIG. 1, it was found that thermosetting adhesive of Example 1 and Example 4 had lower increase rates compared to the thermosetting adhesive from Comparative Examples 1, 4, and 6 when the total electron beam dose was up to 150 kGy. It is also apparent that the increase rate of diameter of the thermosetting adhesive of Example 1 and Example 4 is independent of the total electron beam dose. Therefore, the thermosetting adhesive of this invention has a wide process window and the desired fluidity can be obtained by using only a small electron beam dose.

Figure 6:
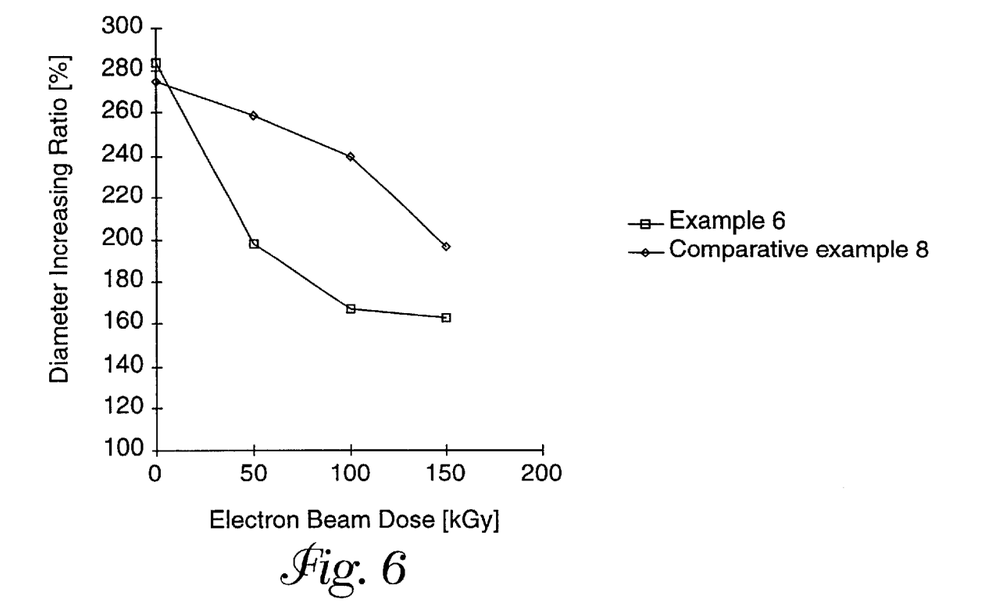
FIG. 6 shows the change in diameter increase ratio for the thermosetting adhesive from Comparative Example 6 and Reference Example 2 as a function of electron beam dose.

FIG. 6 shows the change in increase rate of the thermosetting adhesive from Example 6 and Reference Example 2 as a function of the total electron beam dose. According to FIG. 6, the thermosetting adhesive of Reference Example 2 which did not use an electron beam sensitizer, required 150 kGy to attain the required increase rate of diameter. However, the thermosetting adhesive of Example 6 attains increase rate with only 50 kGy. Therefore, the thermosetting adhesive composition of this invention can obtain the desired fluidity at low electron beam doses.

Figure 2:
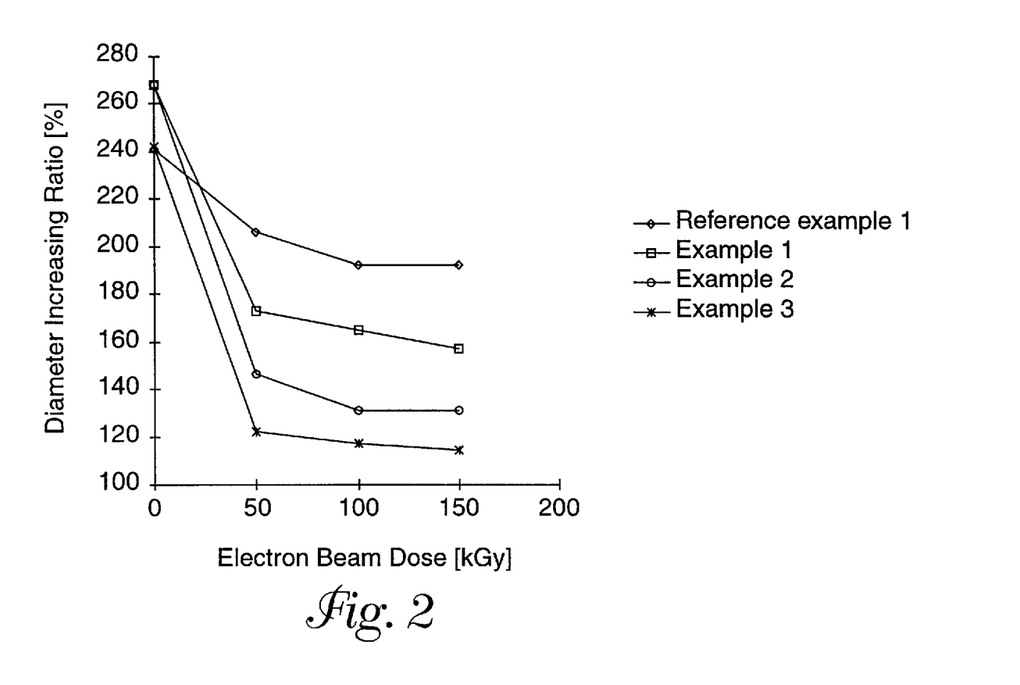
FIG. 2 shows the change in diameter increase ratio for the thermosetting adhesive from Examples 1 to 3 as a function of electron beam dose.
Figure 3:
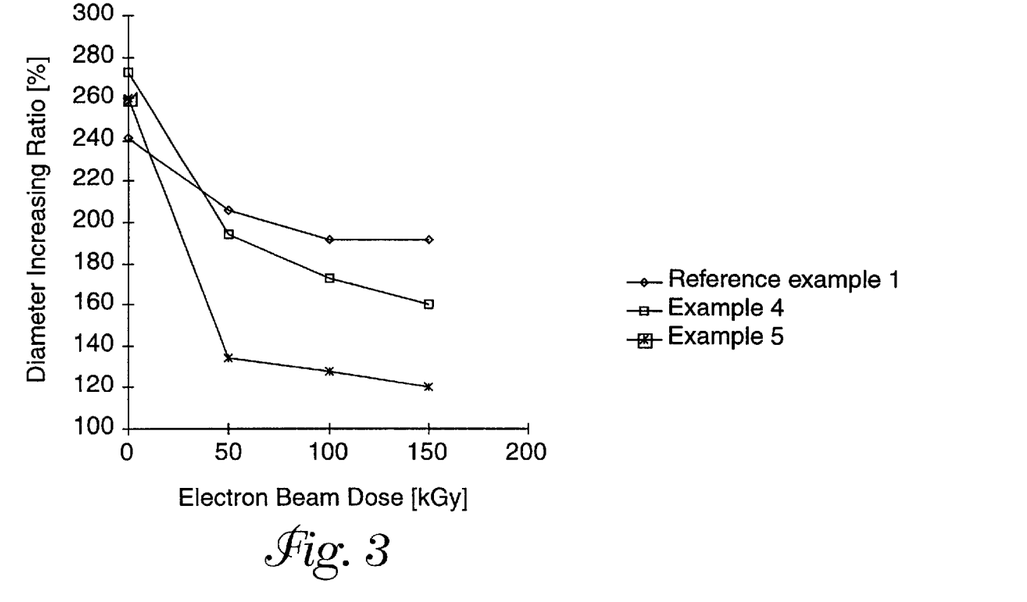
FIG. 3 shows the change in diameter increase ratio for the thermosetting adhesive from Examples 4 and 5 as a function of electron beam dose.

FIG. 2 shows the change in the diameter increase ratio for the thermosetting adhesive from Examples 1 to 3 as a function of the electron beam dose. Also, FIG. 3 shows the change in diameter increase ratio for the thermosetting adhesive composition from Examples 4 and 5 as a function of the electron beam dose. The change in increase rate for the thermosetting adhesive from Reference Example 1 is also listed in FIG. 2 and FIG. 3.

According to FIG. 2 and FIG. 3, the diameter increase ratio of the thermosetting adhesive changes with the electron beam dose sensitizer. It is also apparent that the diameter increase ratio for the thermosetting adhesive from Examples 2 to 5 is independent of the electron beam dose, as was the case in Example 1. Accordingly, the thermosetting adhesive of this invention can obtain the desired fluidity by appropriate adjustment of the electron beam dose sensitizer, not only the electron beam dose.

Figure 4:
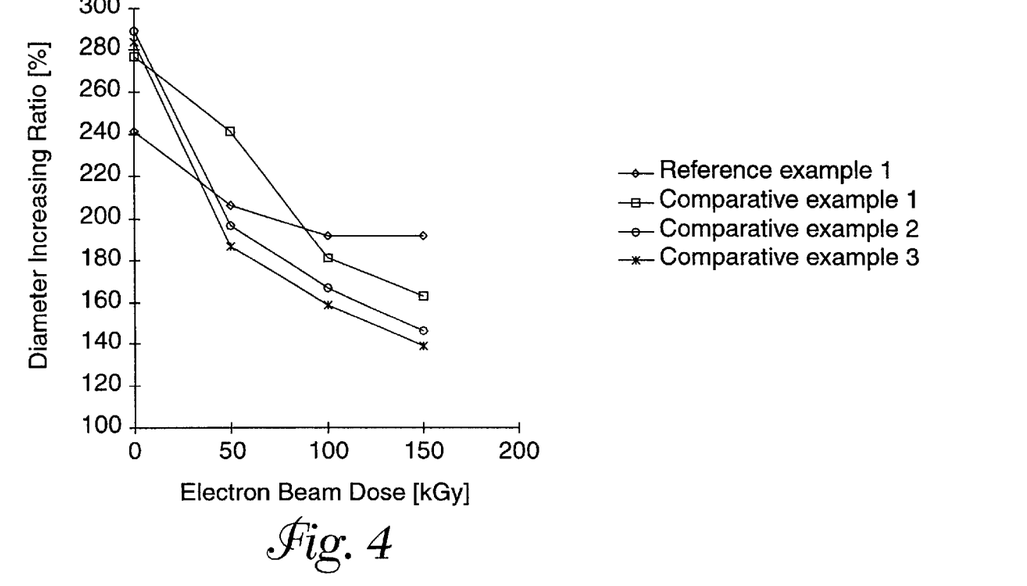
FIG. 4 shows the change in diameter increase ratio for the thermosetting adhesive from Comparative Examples 1 to 3, and Reference Example 1 as a function of electron beam dose.
Figure 5:
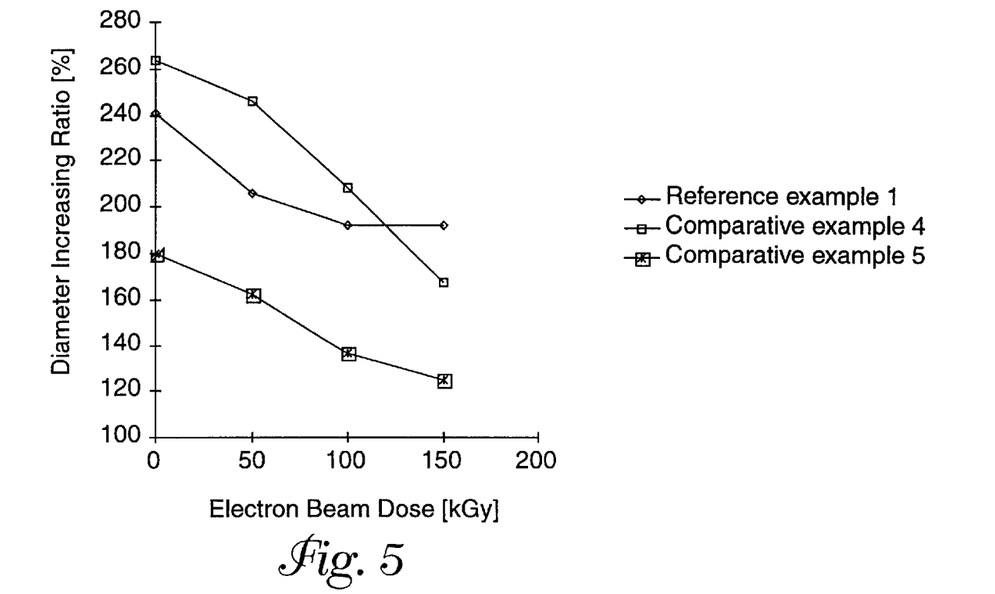
FIG. 5 shows the change in diameter increase ratio for the thermosetting adhesive from Comparative Examples 4 and 5 as a function of electron beam dose.

FIG. 4 shows the change in diameter increase ratio for the thermosetting adhesive from Comparative Examples 1 to 3 and Reference Example 1 as a function of the electron beam dose. Also, FIG. 5 shows the change in diameter increase ratio for the thermosetting adhesive from Comparative Examples 4 and 5 as a function of electron beam dose. The change in diameter increase ratio for the thermosetting adhesive from Reference Example 1 is also listed on the graphs in FIG. 4 and FIG. 5.

According to FIG. 4, the thermosetting adhesive from Comparative Examples 1 to 3 could lower the diameter increase ratio compared to Reference Example 1 if an electron beam with at least 100 kGy or higher is used. Especially, it is found that the thermosetting adhesive from Comparative Examples 2 and 3 can lower the increased rate compared to Reference Example 1 even if the electron beam dose is only about 50 kGy or so. According to FIG. 5, if the electron beam dose is approximately 150 kGy, it is apparent that the thermosetting adhesive from Comparative Example 4 can lower the increase rate compared to Reference Example 1. However, in all cases, it is understood that the diameter increase ratio increases with increasing electron beam dose. Especially for the sample from Comparative Example 5 which was not irradiated, the diameter increase ratio is a lot lower compared to Reference Example 1 which was not irradiated (see FIG. 5), and there is a danger of gelling during kneading. Therefore, it is understood that the fluidity of the thermosetting adhesive from Comparative Examples 1 to 5 cannot be controlled effectively by changing the dose or the ratio of components.

Figure 7:
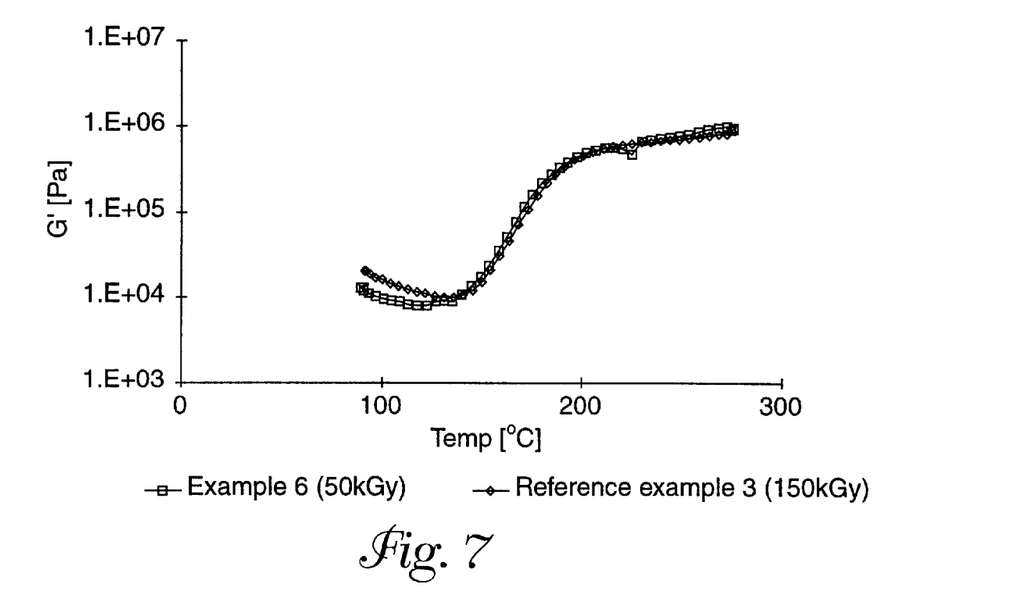
FIG. 7 shows the change in elastic modulus for the thermosetting adhesive from Example 6 and Reference Example 2 as a function of heating temperature in accordance with measurement of viscoelasticity 1.
Figure 8:
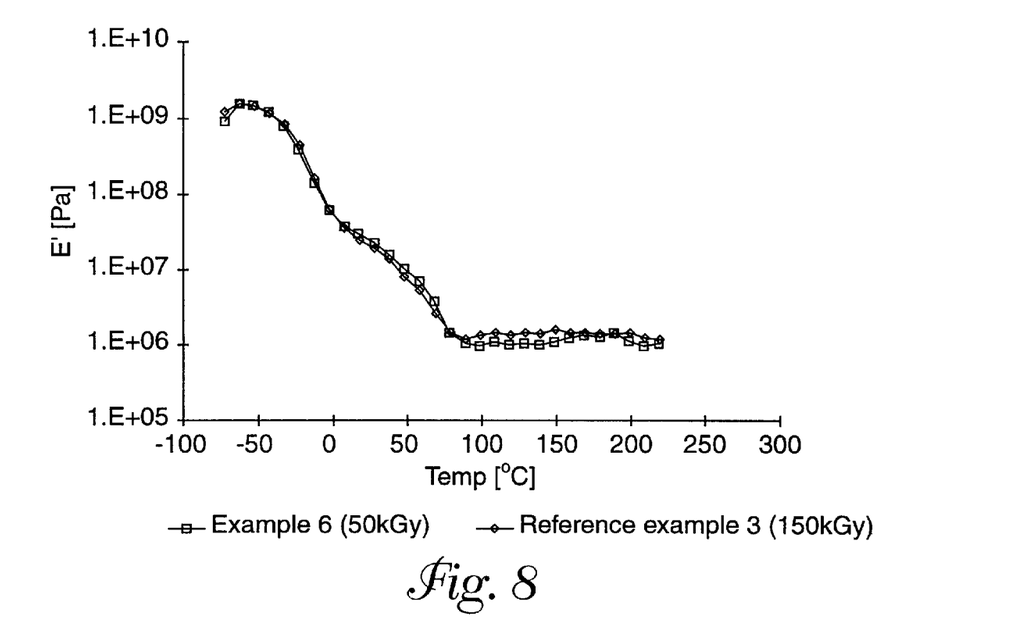
FIG. 8 shows the change in elastic modulus for the thermosetting adhesive from Example 6 and Reference Example 2 as a function of heating temperature in accordance with the measurement of viscoelasticity 2.

FIG. 7 shows the change in elastic modulus for the thermosetting adhesive from Example 6 and Reference Example 2 as a function of heating temperature in accordance with the above measurement of viscoelasticity 1. FIG. 8 shows the change in elastic modulus for the thermosetting adhesive from Example 6 and Reference Example 2 as a function of heating temperature in accordance with the above measurement of viscoelasticity 2.

According to FIG. 7 and FIG. 8, when 1 weight part of electron beam sensitizer is added, there is no change in the elastic modulus compared to the case when a sensitizer is not used. Accordingly, it is understood that the fluidity of the thermosetting adhesive of this invention can be controlled without influencing the thermosetting reaction (post curing) even if the electron beam dose can be reduced by adding electron beam sensitizer.

In Table 2 below, the bond strength before and after heat treatment (post curing) of the thermosetting adhesive from Example 1 and Reference Example 1 are shown.

TABLE 2

|  | Dose | Bond Strength Before Curing | Bond Strength After Curing |
|---|---|---|---|
| Example 1 | 50 Kilo Gray | 27.4 | 14.4 |
| Reference Example 1 | 150 Kilo Gray | 37.1 | 23.0 |

According to Table 2, although the thermosetting adhesive of this invention has lower bonding strength than Reference Example 1, it has sufficient bonding strength for actual use.

In Table 3, the elastic modulus at 250° C. for the thermosetting adhesive from Example 1 and Reference Example 1 is shown.

TABLE 3

|  | Dose | Modulus G' @ 250° C. (Pa) |
|---|---|---|
| Example 1 | 5 mrad | $1.1 \times 10^6$ |
| Reference Example 1 | 15 mrad | $1.2 \times 10^6$ |

According to Table 3, the elastic moduli are almost equal. Therefore, it is found that the fluidity of the thermosetting adhesive of this invention can be controlled without influencing the thermosetting reaction (post curing) even if the electron beam dose is reduced by addition of electron beam sensitizer.

In Table 4, gel time for the thermosetting adhesive from Example 6 and Reference Example 2 according to the measurement of viscoelasticity 3 above is shown.

TABLE 4

|  | Gel Time (minutes) |
|---|---|
| Example 6 | 27 |
| Reference Example 2 | 31 |

According to Table 4, even though the thermosetting adhesive from Example 6 uses an electron beam sensitizer, its gel time is the same as for Reference Example 2 which is stable in the film molding process. Accordingly, the thermosetting adhesive from Example 6 will be stable in the film molding process also.

The thermosetting adhesive of this invention has properties which are advantageous for bonding using electron beam, such as controlled fluidity, viscoelasticity, etc., even if it is cured at reduced electron beam doses.

Various changes and modifications can be made in the invention without departing from the scope or spirit of the invention.

What is claimed is:

1. A thermosetting adhesive composition comprising:

(a) ethylene-glycidyl (meth)acrylate copolymer;

(b) rosin having a carboxyl group; and (c) (meth)acrylate having a carboxyl group, selected from the group consisting of (meth)acrylic acid, (meth)acryloxyethyl phthalate, (meth)acryloxyisopropyl phthalate, ethylene oxide denatured succinate (meth)acrylate, ethylene oxide denatured malonate (meth)acrylate, ω-caroboxy-polycaprolactone monoacrylate, ethylene oxide denature adipate (meth)acrylate, (meth)acrylate dimer, 4-(meth)acryloxyethyl trimellitic anhydride, and 4-(meth)acryloxyethyl trimellitic acid.

2. The thermosetting adhesive composition of claim 1 wherein a crosslinking structure is formed between the molecules of the ethylene-glycidyl (meth)acrylate copolymer, linking ethylene repeating units.

3. The thermosetting adhesive composition of claim 1 wherein the ethylene-glycidyl (meth)acrylate copolymer is present in an amount of from 20 to 99.89 weight percent.

4. The thermosetting adhesive composition of claim 1 wherein the rosin having a carboxyl group is present in an amount of from 0.1 to 30 weight percent.

5. The thermosetting adhesive composition of claim 1 wherein the (meth)acrylate having a carboxyl group is present in an amount of from 0.01 to 10 weight percent.

6. An adhered structure comprising a first adherent, a second adherent, and a layer of the thermosetting adhesive of claim 1 between the first adherent and the second adherent bonding the first and second substrates together.

* * * * *

UNITED STATES PATENT AND TRADEMARK OFFICE
CERTIFICATE OF CORRECTION

PATENT NO. : 6,590,070 B1
DATED : July 8, 2003
INVENTOR(S) : Toriumi, Naoyuki

It is certified that error appears in the above-identified patent and that said Letters Patent is hereby corrected as shown below:

Title page,
Item [56], References Cited, FOREIGN PATENT DOCUMENTS, delete duplicate citing of "JP  10-316955  12/1998".
delete "10-10316955" and insert in place thereof -- 10-316955 --.
Item [75], Inventor, delete "koichiro" and insert in place thereof -- Kohichiro --.

Drawings
Sheet 3 of 4, Fig. 6, Legend, delete "Example 6" and insert in place thereof -- Example 2 --.
Sheet 3 of 4, Legend, delete "Comparative example 8" and insert in place thereof -- Comparative example 6 --.
Sheet 4 of 4, Fig. 7, X Axis Legend, delete "Reference example 3" and insert in place thereof -- Reference example 2 --.
Sheet 4 of 4, Fig. 8, Y Axis Legend, delete "E' [Pa]" and insert in place thereof -- G'[Pa] --.
Sheet 4 of 4, Fig. 8, X Axis Legend, delete "Reference example 3" and insert in place thereof -- Reference example 2 --.

Column 1,
Line 23, delete "10-316925" and insert in place thereof -- 10-316955 --.
Line 33, delete "thee" and insert in place thereof -- the --.

Column 4,
Line 44, delete "are" and insert in place thereof -- is --.

Column 5,
Line 49, delete "verse"and insert in place thereof -- versus --.
Line 62, delete "mount" and insert in place thereof -- amount --.

UNITED STATES PATENT AND TRADEMARK OFFICE
CERTIFICATE OF CORRECTION

PATENT NO. : 6,590,070 B1
DATED : July 8, 2003
INVENTOR(S) : Toriumi, Naoyuki

It is certified that error appears in the above-identified patent and that said Letters Patent is hereby corrected as shown below:

Column 6,
Line 6, delete "denature" and insert in place thereof -- denatured --.
Line 7, delete "4-(meh)" and insert in place thereof -- 4-(meth) --.
Line 39, insert -- be -- following "to".

Column 7,
Line 3, delete "part" and insert in place thereof -- parts --.

Column 12
Line 41, delete "ω-carboxy-polycaprolactone" and insert in place thereof -- ω-carboxy-polycaprolactone --.
Line 42, delete "denature" and insert in place thereof -- denatured --.

Signed and Sealed this

Fifth Day of April 2005

JON W. DUDAS
*Director of the United States Patent and Trademark Office*